(12) United States Patent
Sadry

(10) Patent No.: US 11,126,756 B2
(45) Date of Patent: *Sep. 21, 2021

(54) METHODS AND SYSTEMS FOR PRIVILEGED EXECUTION SUPPORT FOR FILE SYSTEM COMMANDS ON A STORAGE DEVICE

(71) Applicant: Western Digital Technologies, Inc., San Jose, CA (US)

(72) Inventor: Nauzad Sadry, Irvine, CA (US)

(73) Assignee: Western Digital Technologies, Inc., San Jose, CA (US)

(*) Notice: Subject to any disclaimer, the term of this patent is extended or adjusted under 35 U.S.C. 154(b) by 48 days.

This patent is subject to a terminal disclaimer.

(21) Appl. No.: 16/126,579

(22) Filed: Sep. 10, 2018

(65) Prior Publication Data

US 2019/0005270 A1 Jan. 3, 2019

Related U.S. Application Data

(63) Continuation of application No. 14/061,592, filed on Oct. 23, 2013, now Pat. No. 10,073,987.

(60) Provisional application No. 61/807,673, filed on Apr. 2, 2013.

(51) Int. Cl.
*G06F 17/00* (2019.01)
*G06F 21/78* (2013.01)
*G06F 16/13* (2019.01)

(52) U.S. Cl.
CPC .............. *G06F 21/78* (2013.01); *G06F 16/13* (2019.01)

(58) Field of Classification Search
CPC .......... G06F 21/62; G06F 21/70; G06F 21/71; G06F 21/78; G06F 21/79; G06F 21/80; G06F 21/82; G06F 21/1466; G06F 16/13
See application file for complete search history.

(56) References Cited

U.S. PATENT DOCUMENTS

| | | | |
|---|---|---|---|
| 10,073,987 B2* | 9/2018 | Sadry | G06F 16/13 |
| 2005/0223164 A1* | 10/2005 | Kitamura | G06F 21/10 711/112 |
| 2010/0070544 A1* | 3/2010 | Gopalan | G06F 3/0671 707/822 |
| 2010/0153660 A1* | 6/2010 | Lasser | G06F 12/0246 711/154 |
| 2010/0211737 A1* | 8/2010 | Flynn | G06F 3/0688 711/114 |

* cited by examiner

*Primary Examiner* — Greta L Robinson
(74) *Attorney, Agent, or Firm* — Chang & Hale LLP

(57) ABSTRACT

The present invention relates to a storage device that is able to execute higher level commands, such as network-level, file-system commands, with privileged access to various resources, such as the storage media, hardware, memory, firmware, etc. In one embodiment, the storage device is configured to receive and execute network-level file-system commands, such as Server-Message-Block protocol commands. In particular, the storage device comprises a drive having a storage media and a communications interface, such as a network interface, and a controller. The controller is configured to interpret and execute network-level, file-system commands received from the communications interface on data stored on the storage media. Accordingly, the storage device can service the network-level, file-system commands more efficiently and without the need for user-space applications.

19 Claims, 4 Drawing Sheets

METHODS AND SYSTEMS FOR PRIVILEGED EXECUTION SUPPORT FOR FILE SYSTEM COMMANDS ON A STORAGE DEVICE

CROSS-REFERENCE TO RELATED APPLICATION

The present application is a continuation of U.S. patent application Ser. No. 14/061,592 filed on Oct. 23, 2013, entitled METHODS AND SYSTEMS FOR PRIVILEGED EXECUTION SUPPORT FOR FILE SYSTEM COMMANDS ON A STORAGE DEVICE, which claims priority to U.S. Provisional Patent Application No. 61/807,673, filed Apr. 2, 2013, the disclosures of which are hereby incorporated by reference in their entireties.

BACKGROUND

Data storage is a fundamental function of virtually all computing systems. Today, there are wide variety of data storage devices and technologies available. Typically, however, all data storage involves the use of a data storage device or drive, such as a hard disk drive, solid-state drive, etc. The known types of drives store and retrieve information at the block level and are interfaced using some form of block-level access, such as SCSI, IDE/ATA, SAS, SATA, etc. Drives may often be directly attached to a client or host computing device with a cable, and thus, are typically referred to as a direct attached storage or "DAS." To further extend the availability of storage, one or more drives may be accessed over a network, such as, using iSCSI, network attached storage ("NAS") or storage area networks ("SAN").

Information, however, is usually organized based on a file system. File systems, such as network file system ("NFS"), common Internet file system ("CIFS"), server message block ("SMB"), etc., are well known file systems that employ network-level file-system commands to provide for shared access to files, etc. over a network, e.g., such as an Internet Protocol ("IP") based network. Unfortunately, network-level file-system commands are not natively processed by storage drives.

Instead, the storage drives must be coupled with another device or computing resource that executes and translates the network-level file system commands into block-level commands. DAS drives rely on the operating system and application-level software running on their corresponding host, such as a personal computer, a server, etc. NAS devices comprise a controller that executes an operating system, such as LINUX or Windows, which supports running an application that can process network-level file-system commands. iSCSI and SAN storage systems rely on application servers to handle the file-system commands. For example, the file-sharing software, SAMBA, is a well-known application that can receive file-system commands and interface with storage drives. However, this software runs in user space and uses device drivers and other services provided by the operating system running on the storage device. Unfortunately, user space software drivers can be unstable and/or suffer from poor performance. This performance disadvantage is especially pronounced on embedded computing devices and storage devices. Therefore, it would be desirable to provide methods and systems that improve the performance of computing devices, especially storage systems.

BRIEF DESCRIPTION OF THE DRAWINGS

Systems and methods which embody the various features of the invention will now be described with reference to the following drawings, in which.

DETAILED DESCRIPTION

The embodiments relate to optimizing access to stored files, especially in a network environment. In one embodiment, the storage drives are able to execute higher level commands, such as network-level, file-system commands, with privileged access to various resources, such as the storage media, hardware, memory, firmware, etc. In one embodiment, the storage drive is configured to receive and execute network-level file-system commands, such as NFS or SMB commands. Accordingly, the storage drives can directly receive and execute the network-level, file-system commands more efficiently and without the need for executing user-space applications.

The embodiments of the invention may be implemented on any of a variety of operating systems, such as LINUX, Windows, UNIX, Mac OSX, and the like. For purposes of illustration, an exemplary embodiment for a storage device that runs the LINUX operating system is shown. One embodiment may employ a special purpose hardware or firmware component to execute the file-system commands. Alternatively, another embodiment uses kernel-mode device drivers to support network file system commands.

In addition, the embodiments may be implemented on any type of storage drive with storage media comprising a hard disk media, solid-state media, flash memory, etc. In the embodiments, the network-level file-system commands are transport agnostic, and thus, may be run over Ethernet, Wi-Fi, Infiniband, etc. The network level file-system protocols may include, but are not limited to, NFS, SMB, Apple Filing Protocol ("AFP"), file transfer protocol ("FTP"), remote file system ("RFS"), WebDAV, etc.

Certain embodiments of the inventions will now be described. These embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. To illustrate some of the embodiments, reference will now be made to the figures.

Figure 1A:
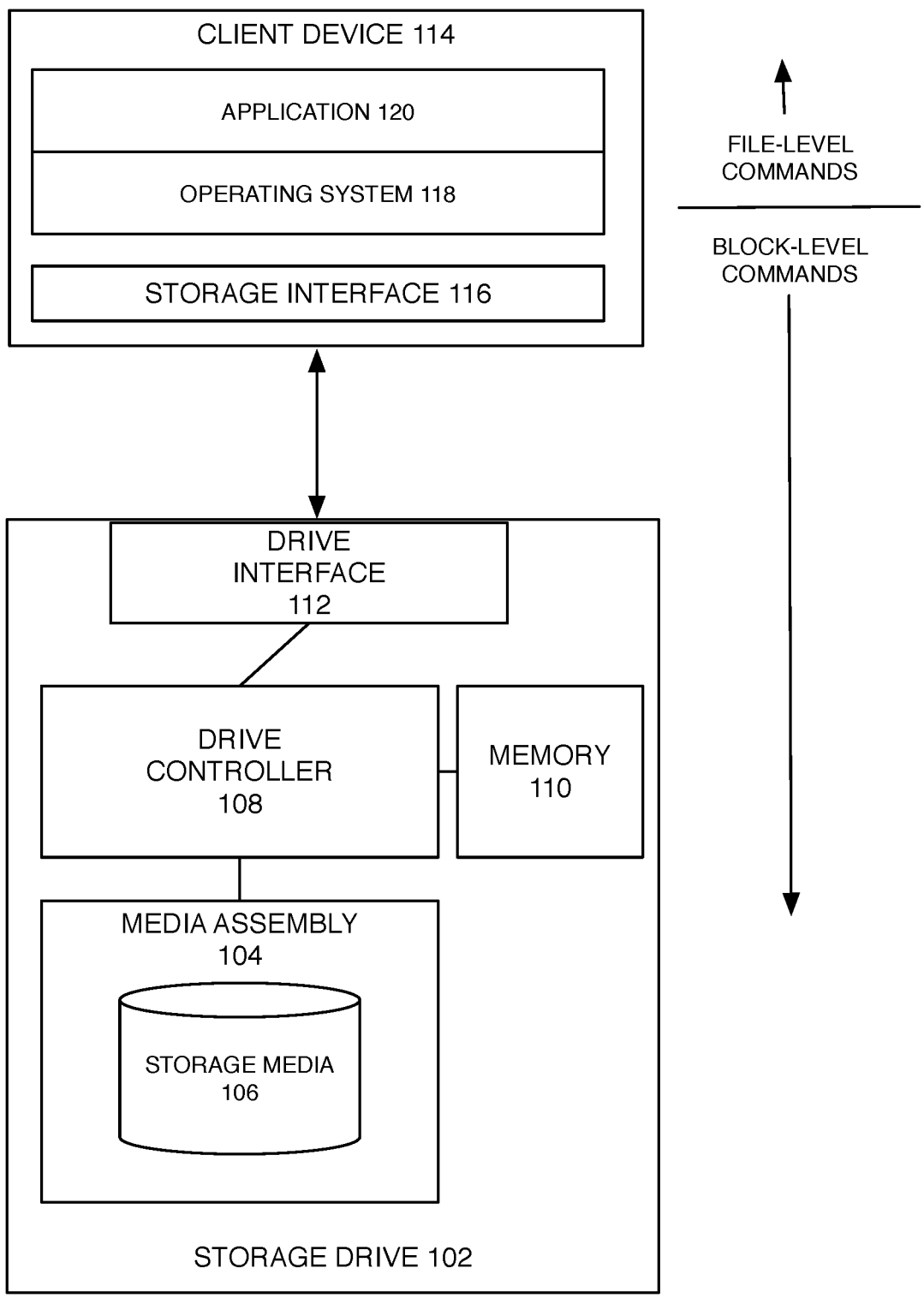
FIGS. 1A and 1B illustrates a conventional storage device that employs a user-space application to support file system commands.
Figure 1B:
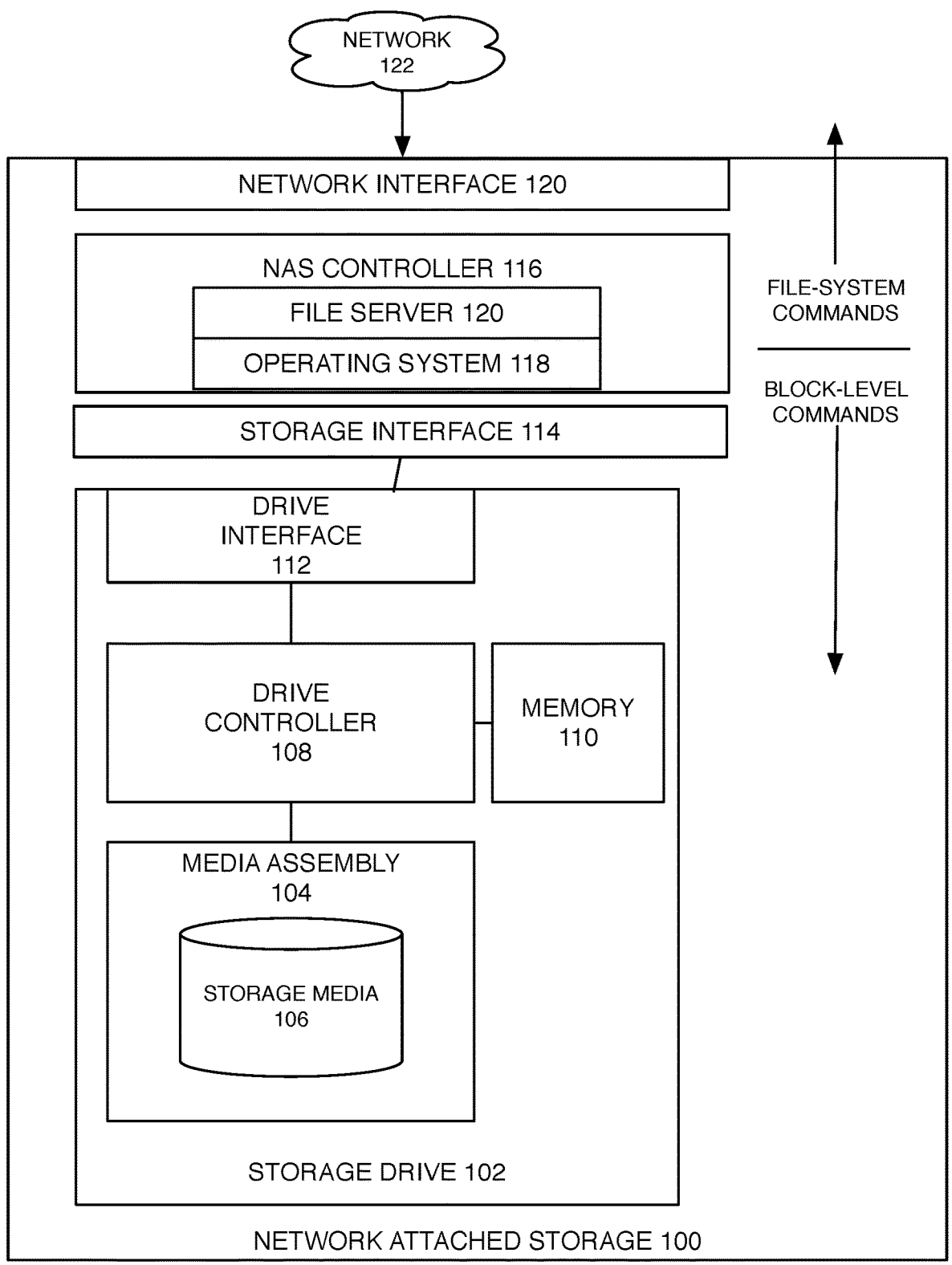

FIGS. 1A and 1B shows a conventional storage device that provides a network share over a network. In particular, FIG. 1A shows a conventional direct attached storage drive. FIG. 1B shows a conventional network attached storage.

Referring now to FIG. 1A, a storage drive 102 may comprise a media assembly 104 having a storage media 106, a drive controller 108, a memory 110, and a drive interface 112. These components are well known to those skilled in the art.

As shown, the storage drive 102 is connected to a client device 114. As a conventional drive, the storage drive 102 is a block-level device and interfaces the client device 114 via storage interface 116. For example, the storage interface 116 and drive interface 112 may be a SCSI, IDE/ATA, SAS, or SATA interface.

In order to implement a file system, the client device 114 also comprises an operating system 118, which supports the execution of one or more applications 120. During operation, the applications 120 operate based on files and a file system, which are controlled and maintained by the operating system 118. In order to access or retrieve a file, the operating system 118 identifies which blocks correspond to a particular file and provide various block-level commands to the storage drive 102 via the drive interface 112. The controller 108 then locates the requested blocks on the storage media 106 and instructs the media assembly 104. Therefore, in this basic storage configuration, file-system commands are handled at the application level by an application running in an operating system's user space.

However, the same type of approach is used in shared files systems or distributed files systems over a network. As shown in FIG. 1B, a network attached storage (NAS) 100 is shown. The NAS 100 may comprise one or more storage drives 102, for example, in a pedestal or rack mounted chassis. In addition, the NAS 100 comprises a NAS controller 116, which executes an operating system 118 and a file server application 120. The NAS 100 further comprises a network interface 120 to connect to a network 122.

Notably, the file server application 120 is an application that runs in the user-space of the operating system 118 to support a network share. In this conventional configuration, the network interface 120 merely passes network communications from the network 120 to the operating system 118, which then forwards the appropriate communications to the file server 120. In turn, the file server 120 interprets and executes the various network file system commands by translating these file-system commands into block-level commands for the network share stored on the storage drive 102. Therefore, the conventional storage architectures require the use of a user-space application to execute network-level file-system commands.

As noted above, the embodiments overcome the need for user-space applications and software to support higher level commands on a drive, such as network-level file-system commands. In some embodiments, the drive can directly execute file-system commands, such as NFS commands, SMB commands, etc.

Figure 2:
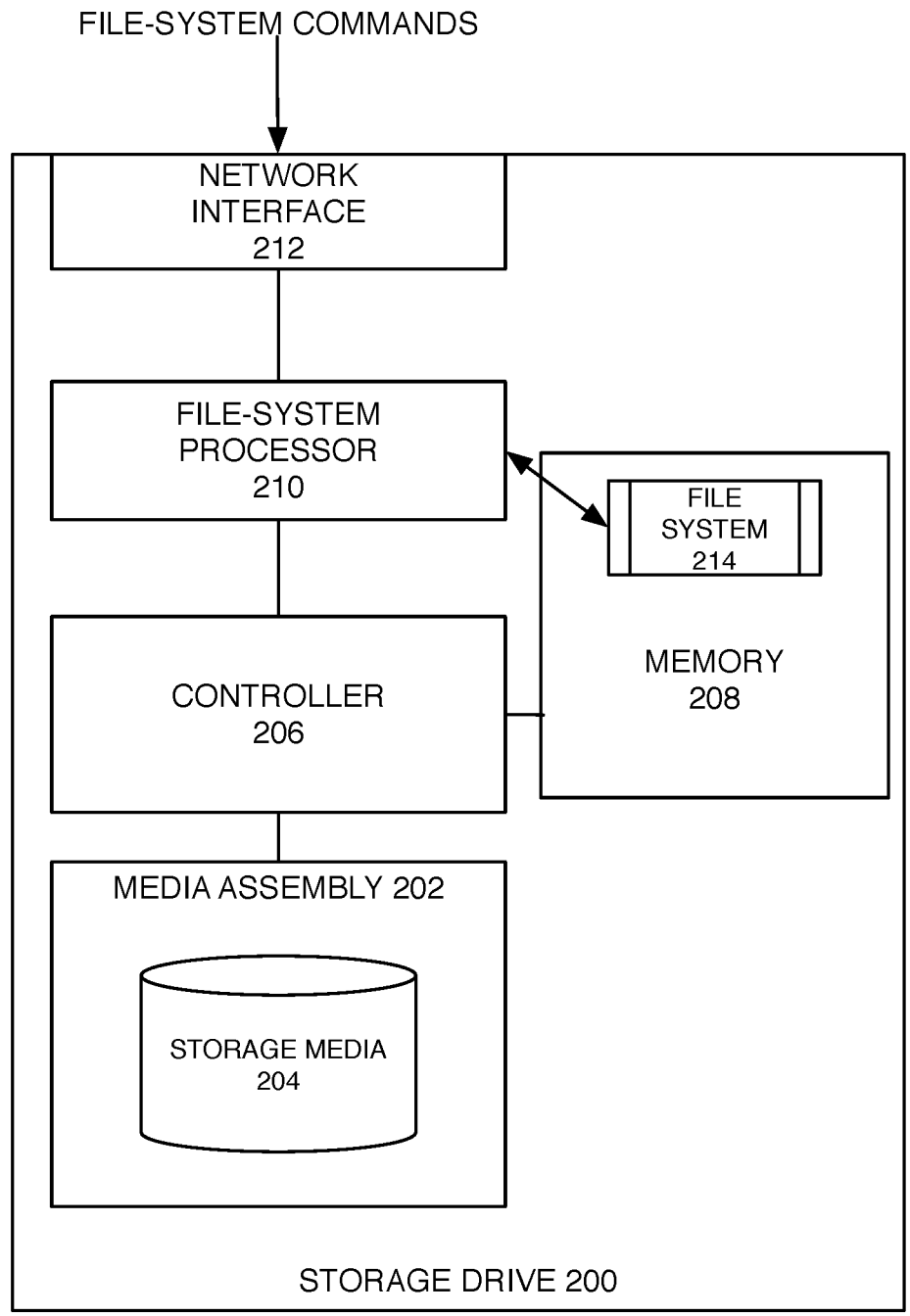
FIG. 2 illustrates an exemplary storage device that supports privileged access to resources of the storage device for execution of file system commands.

FIG. 2 shows an exemplary embodiment of a storage drive 200 that can execute file-system commands. As shown, the storage drive 200 comprises a media assembly 202, a storage media 204, a controller 206, a memory 208, a file-system processor 210, a network interface 212, and a file system 214. These components will now be briefly described.

The media assembly 202 and storage media 204 represent the components and physical medium used by the storage drive 200 to store and access data. For example, in one embodiment, the media assembly 202 and storage media 204 may be implemented as a hard disk medium, a solid state medium, a flash memory, etc. Any form of storage technology and medium may be used in the embodiments.

The controller 206 controls the operations of the storage drive 200. For example, the controller 206 may control the operations for reading and writing data to the media assembly 202 and storage media 204. The controller 206 may be implemented using well-known components to those skilled in the art.

The memory 208 serves as temporary memory location for the controller 206, such as for buffering data, queuing instructions, etc. As shown, the memory 208 also provides a storage location for at least a portion of a file system 214 that has been implemented on the storage drive 200.

File-system processor 210 represents the processing resources that receive and execute network-level file-system commands for the storage drive. As described further below, the file-system processor 210 may be implemented in a variety of ways. The file-system processor 210 possesses privileged access to resources of the storage drive, such as the media assembly 202 and storage media 204. Privileged access may refer to those forms of access that are restricted to an exclusive group of components or access that is treated preferentially or differently from normal access requests, such as conventional application software requests running in the user space of an operating system. For example, in some embodiments, privileged access may refer to direct access that does not require translation of commands or an intermediate component. Kernel device drivers are one example of components having privileged access in accordance with some embodiments. In another embodiment, as further described below, the file-system processor 210 may be implemented based on hardware or firmware.

In some embodiments, the storage drive 200 is an embedded device running an embedded operating system. In other embodiments, the controller 206 in the storage drive 200 may be loaded with an operating system, such as LINUX or Windows and the file-system processor 210 comprises a set of kernel device drivers that are configured to execute network-level file-system commands, such as SMB commands or NFS commands. The file-system processor 210 may also comprise block-level storage media device driver, such as a SATA driver, to interface with the media assembly 202 and storage media 204.

In some embodiments, the file-system processor 210 may comprise device drivers that implement various security protections, for example, to prevent buffer overruns and restriction of certain operations. The device drivers may be written in known programming languages, such as C, etc.

The kernel device drivers used in the file-system processor 210 may be included in the storage device 200 in various ways. For example, in one embodiment, the kernel device drivers may be loaded on to the controller 206 as loadable kernel modules. Alternatively, the file-system processor 210 may be installed as part of the embedded operating system in controller 206.

Since the file-system processor 210 operates in the kernel space of the operating system, it may run with privileged access to the resources of the storage drive 200, such as the memory 208, the controller 206, the media assembly 202, and storage media 204 relative to other code or software running in user space on the storage device 200.

These forms of kernel device drivers in the file-system processor 210 allow the storage device 200 to execute the network file system commands in kernel space with enhanced privileges, which is faster and more efficient than using user space software.

In some embodiments, the file-system processor 210 may be implemented using a combination of hardware and/or firmware. For example, in one embodiment, the file-system processor 210 may comprise firmware, such as a field-programmable gate array, or application-specific integrated circuit, which is configured to interpret and execute network-level file-system commands. In one embodiment, the file-system processor 210 comprises firmware that is configured to execute SMB commands. In another embodiment, the file-system processor 210 comprises firmware that is configured to execute NFS commands. As noted, the file-system processor 210 may be configured to execute any type of file system or protocol.

The network interface 122 provides a communications interface for the storage drive 100. The network interface 122 may support any type of wired or wireless communications, such as Ethernet, Gigabit Ethernet, inifiniband, Wi-Fi, etc.

In one embodiment, the network interface 122 comprises one or more hardware or firmware components for sending and receiving packets. For example, the network interface 122 may be configured to encapsulate/de-encapsulate TCP/IP packets transporting various network-level file-system commands, such as SMB or NFS commands. The network interface 122 then passes these commands to the file-system processor 210 for interpretation and execution.

In one embodiment, the network interface 122 may also provide various security features, such as encryption/decryption. For example, the network interface 122 may comprise an encryption chip or system.

In some embodiments, the network interface 122 is supported by a device driver executing on the controller 206 and/or file-system processor 210. In one embodiment, the device driver for the network interface 122 runs in the kernel space provided by the operating system running on the controller 206.

Figure 3:
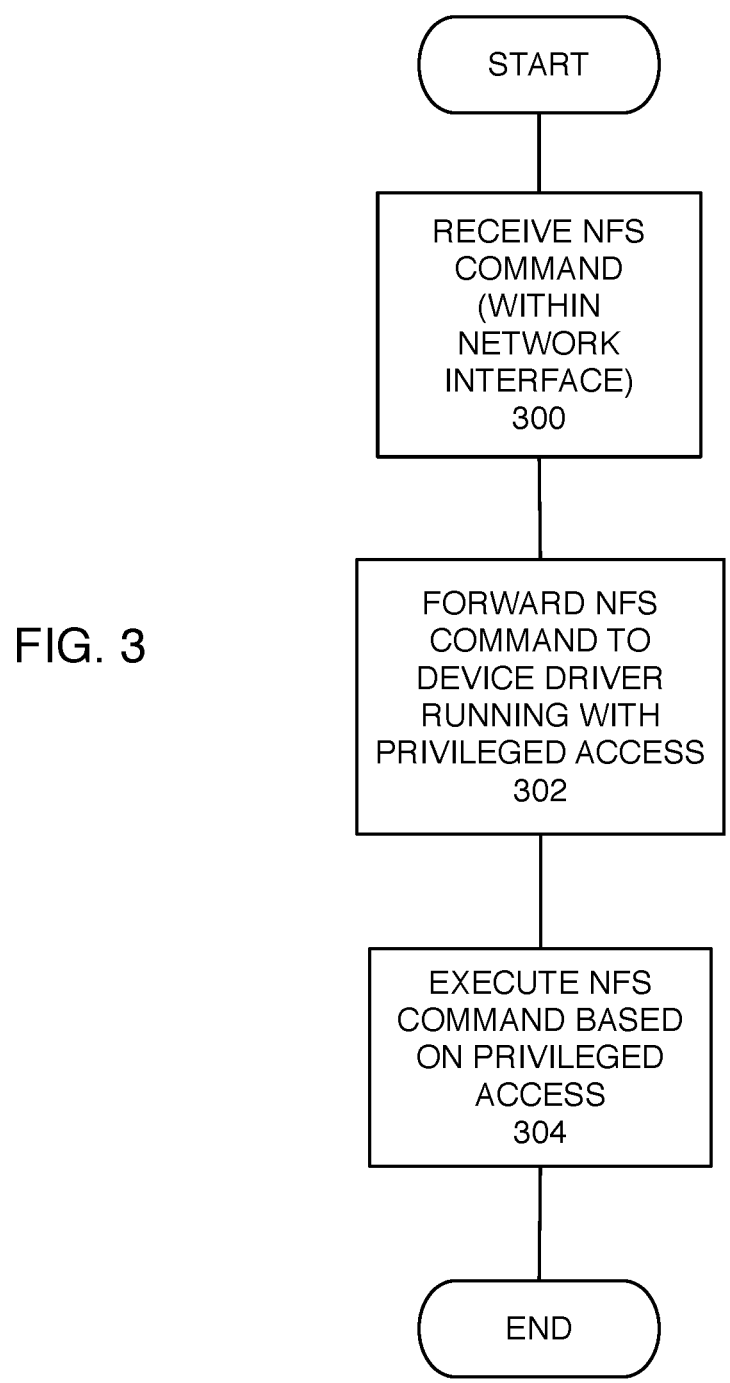
FIG. 3 illustrates an exemplary process flow in accordance with an embodiment of the present invention.

FIG. 3 illustrates an exemplary process flow of one embodiment. For purposes of illustration, FIG. 3 relates to a storage drive 200 that is attached to network via a network interface, such as an Ethernet or Gigabit Ethernet interface, and providing access to its files based on NFS commands received from a client (not shown) or other host device (not shown). Of course, other types of network-level file-system commands may be processed and executed by the storage drive 200.

As shown, in stage 300, the storage drive 200 may receive one or more network file system ("NFS") commands via the network interface 212. The NFS commands may be encapsulated within one or more data packets, such as IP packets, transported over Ethernet frames on a network to which the network interface 212 is connected. As noted, the network interface 212 may be an Ethernet or Gigabit Ethernet interface. The components for such types of interfaces are known to those skilled in the art. The network interface 212 may then perform various data receiving and transmitting functions related to de-encapsulating the NFS commands from the Ethernet frame and IP packets.

In stage 302, the network interface 212 may forward the NFS command to the file-system processor 210. File-system processor 210 may comprise hardware and/or software running on the controller 206, which has privileged access to the other components of the storage drive 200. As noted previously, for example, in one embodiment, the file-system processor 210 may be implemented as special-purpose firmware (such as a field-programmable gate array or "FPGA", or application specific integrated circuit, or "ASIC") on the storage drive 200. Alternatively, the file-system processor 210 may be program code, such as a collection of software and device drivers running on the controller 206.

In order to support execution of the network-level file-system commands, such as an NFS command, the file-system processor 210 may access file system data 214 stored in the memory 208. The file system data 214 may also be retrieved from storage media 204 by the file-system processor 210.

In stage 304, the file-system processor 210 executes the network-level file-system command, such as a NFS command or SMB command, by using its privileged access to the resources of the storage drive 200. Of note, in contrast to conventional storage drives, the storage drive 200 is able to execute the file-system command itself rather than relying on another device, such as a client computer running application software or application-level software running on the drive. Instead, as shown in FIGS. 2 and 3, the storage drive 200 may receive the file-system commands directly and execute them using the file-system processor 210.

The file-system processor 210 may execute the file-system commands based on privileged access. For example, the file-system processor 210 may be firmware that is connected to the controller 206 and given access to its processing logic and may have privileged access to the media assembly 202 and storage media 204. In addition, the file-system processor 210 may have privileged access to the memory 208.

Alternatively, in another embodiment, the file-system processor 210 may be software running on the controller 206, but having privileged access as a kernel-level application or kernel device drivers running within the operating system installed on controller 206.

In one embodiment, file-system processor 210 executes the file-system commands by providing file-level commands, rather than block-level commands, to the controller 206 and media assembly 202. In order to interpret the file-level commands, the controller 206 and media assembly 202 may be configured to employ a mapping or data structure that maps a file to locations on the storage media 204. For example, an exemplary table is illustrated below for executing NFS commands.

| File Handle | Node | Generation | Storage Media Sector |
|---|---|---|---|
| | | | |

Such a table may be maintained by the file-system processor 210 and stored in the memory 208 or in a location on the storage media 204. The above table is merely exemplary and one of ordinary skill will understand that the embodiments may be implemented for other types of file systems and file-system commands.

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments, which do not provide all of the features and advantages set forth herein, are also within the scope of this disclosure. Accordingly, the scope of the present disclosure is intended to be defined only by reference to the appended claims.

What is claimed is:

1. A storage drive configured to execute network-level file-system commands directly without needing an external computing resource to execute and translate the network-level file-system commands into block-level commands, the storage drive comprising:
 a network interface for receiving network-level file-system commands from the external computing resource;
 a physical storage medium configured to store files;
 a memory configured to store:

a mapping of the files to block locations on the physical storage medium; and hardware circuitry comprising at least one of a controller or a processor, the hardware circuitry coupled to the physical storage medium and the memory, the hardware circuitry configured to:

receive network-level file-system commands associated with files stored on the physical storage medium;

translate, without needing the external computing resource, the network-level file-system commands into block-level commands;

determine, using the mapping, one or more block locations on the physical storage medium associated with the stored files; and execute the block-level commands for the one or more block locations on the physical storage medium.

2. The storage drive of claim 1, wherein the storage drive is a hard disk drive (HDD).

3. The storage drive of claim 1, wherein the storage drive is a solid state drive (SSD).

4. The storage drive of claim 1, wherein the physical storage medium comprises a solid-state medium or a hard disk medium.

5. The storage drive of claim 1, wherein the storage drive is not a standalone (networked attached storage) NAS device.

6. The storage drive of claim 1, wherein the hardware circuitry comprises the controller, the controller configured to control the physical storage medium.

7. The storage drive of claim 6, wherein the hardware circuitry further comprises the processor, the processor configured to translate and execute the block-level commands.

8. The storage drive of claim 1, wherein the hardware circuitry has privileged access to the physical storage medium.

9. The storage drive of claim 1, wherein the hardware circuitry is further configured to execute the network-level file-system commands in kernel space.

10. A method of processing network-level file-system commands by a storage drive without needing an external computing resource to execute and translate the network-level file-system commands into block-level commands, the storage drive comprising a physical storage medium configured to store files, a memory configured to store a mapping of the files to block locations on the physical storage medium, a network interface for receiving network-level file-system commands from the external computing resource, and hardware circuitry comprising at least one of a controller or a processor, the hardware circuitry coupled to the memory and the physical storage medium, the method comprising:

receiving, on the network interface, network-level file-system commands associated with the files stored on the physical storage medium;

translating, without needing the external computing resource, the network-level file-system commands into block-level commands;

determining, using a mapping of files to block locations on the physical storage medium, one or more block locations on the physical storage medium associated with the stored files; and executing the block-level commands for the one or more block locations on the physical storage medium.

11. The method of claim 10, wherein the storage drive is a hard disk drive (HDD).

12. The method of claim 10, wherein the storage drive is a solid state drive (SSD).

13. The method of claim 10, wherein the physical storage medium comprises a solid-state medium or a hard disk medium.

14. The method of claim 10, wherein the storage drive is not a standalone NAS device.

15. The method of claim 10, wherein the hardware circuitry comprises the controller, the controller configured to control the physical storage medium.

16. The method of claim 15, wherein the hardware circuitry further comprises the processor, the processor configured to translate and execute the block-level commands.

17. The method of claim 10, wherein the hardware circuitry has privileged access to the physical storage medium.

18. The method of claim 10, wherein translating the network-level file-system commands comprises executing the network-level file-system commands in kernel space.

19. A storage drive configured to execute network-level file-system commands directly without needing an external computing resource to execute and translate the network-level file-system commands into block-level commands, the storage drive comprising:

a physical storage means for storing files;

a memory means configured to store a mapping of the files to block locations on the physical storage means;

a network interface means for receiving network-level file-system commands from the external computing resource; and processing means coupled to the physical storage means and the memory means, the processing means configured to:

receive network-level file-system commands associated with files stored on the physical storage means;

translate, without needing the external computing resource, the network-level file-system commands into block-level commands;

determine, using the mapping, one or more block locations on the physical storage means associated with the stored files; and execute the block-level commands for the one or more block locations on the physical storage means.

* * * * *